Figure 1:
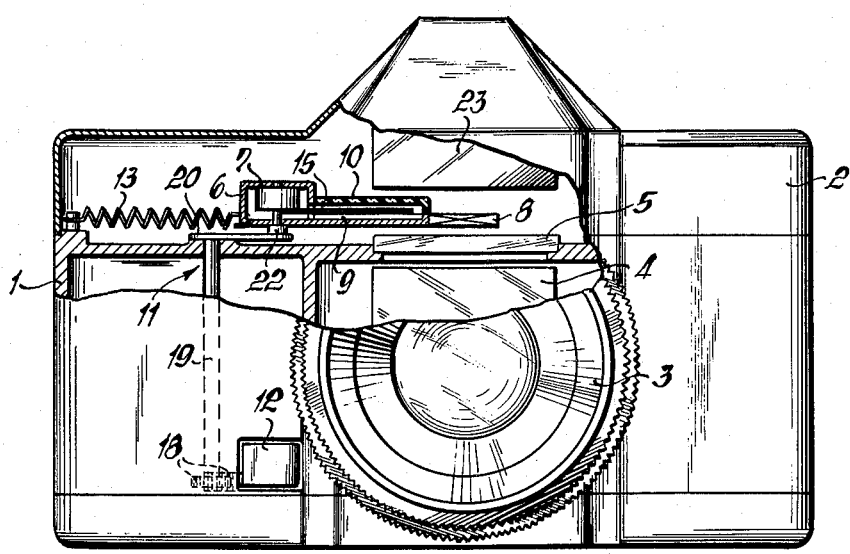

INVENTOR

United States Patent Office 3,109,356
Patented Nov. 5, 1963

3,109,356
SINGLE LENS REFLEX CAMERA WITH
EXPOSURE METER
Walter Swarofsky and Fritz Renneberg, Braunschweig,
Germany, assignors to Voigtlander A.G., Braunschweig, Germany, a corporation of Germany
Filed Jan. 2, 1962, Ser. No. 163,836
Claims priority, application Germany Jan. 12, 1961
6 Claims. (Cl. 95—10)

This invention relates to single lens reflex cameras equipped with exposure meters, and wherein the photosensitive cell of the meter is mounted for selective movement into and out of the path of light rays entering through the objective lens. More particularly, the present invention is directed to an improved camera of this type in which the distadvantages of known arrangements for thus selectively positioning the photosensitive cell are obviated.

Various arrangements have been provided in single lens reflex cameras for moving the photosensitive cell of the exposure meter into and out of the path of light rays entering through the objective lens. For example, the photosensitive cell has been mounted on the hinged mirror of the camera so that it may be moved into and out of the light ray path, directed toward the film or other photosensitive medium, responsive to corresponding movement of the mirror. In another arrangement, the mirror is designed to be partially light permeable and the photosensitive cell is positioned behind the partially light permeable mirror. In still another arrangement, the photosensitive cell is mounted upon a special support which is swung into and out of the path of the light rays, directed toward the film or the like, independently of the mirror.

All of these known arrangements have the disadvantage that the photosensitive cell must be moved out of the path of light rays entering through the objective lens and directed toward the film or the like, along with the movement of the mirror out of such path, when an exposure is to be taken. These disadvantages pertain whether the photosensitive cell is movable conjointly with the mirror or is movable independently thereof.

In accordance with the invention, these disadvantages are avoided by providing an arrangement in which the photosensitive cell may be moved into the path of light rays entering through the objective lens but need not be moved out of such path when a picture is being taken, although means preferably are provided for automatically retracting the photosensitive cell. More particularly, in the present arrangement the photosensitive cell is mounted for movement between a retracted position and an extended position in which the photosensitive cell is positioned in light receiving relation over the viewing surface of the viewfinder screen of the camera. Preferably, this is effected by providing a slide which is movable parallel to the viewing surface of the viewfinder screen and upon which the photosensitive cell is mounted in such a manner that, when it is positioned over the viewing surface of the screen, it will have those light rays entering through the objective and passing through the screen impinged thereon.

More particularly, the invention is applicable to an arrangement wherein there is a viewing screen lying in a plane which is parallel to a bottom wall of the camera, and the slide is mounted for movement parallel to such plane and within the camera and below the camera hood. As an advantageous feature of the invention, the indicating or moving coil instrument of an electric exposure meter may also be mounted on such slide so that, when the slide is moved to position the photosensitive or photoelectric cell in light receiving relation over the viewing surface of the viewfinder screen, the indicator of the measuring instrument is also visible to one looking at the viewfinder. As a further feature, the movement of the photosensitive cell to a light ray receiving position over the viewing surface of the viewfinder screen may be co-ordinated with the adjustment of the diaphragm of the objective lens. It is further within the scope of the present invention to position scanning or resetting members for the indicating instrument of the exposure meter on the movable slide so as to be movable therewith to a position wherein they may be viewed by the person using the camera and looking through the viewfinder.

Figure 2:
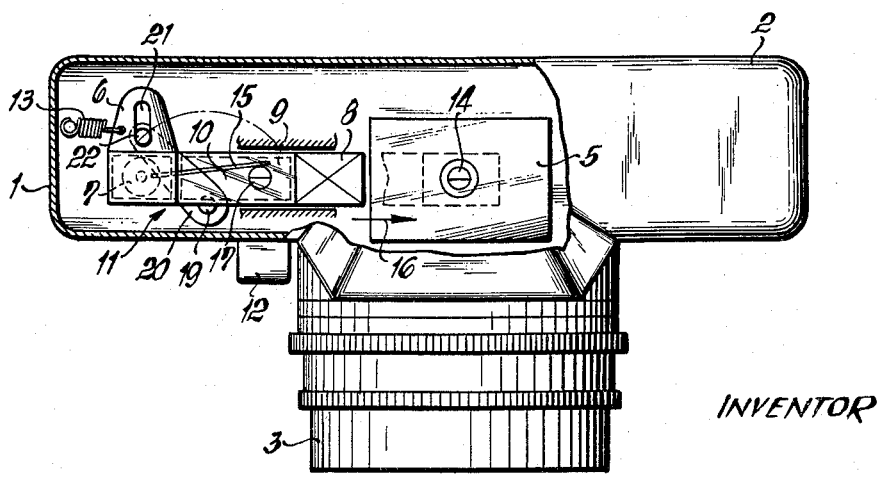

For an understanding of the principles of the invention, reference is made to the following description of a typical embodiment thereof as illustrated in the accompanying drawings. In the drawings:

FIG. 1 is a front elevational view, partly broken away, of a single lens reflex camera embodying the invention; and FIG. 2 is a top plan view, partially broken away, of the camera shown in FIG. 1.

Referring to the drawings, the reflex camera illustrated therein includes a casing or housing 1, a hood or cover 2, and the usual objective lens 3. Likewise in the usual manner, a mirror 4 is hingedly mounted in the camera inwardly of the objective lens 3 for movement to and from a position in which it reflects light rays, entering through the objective 3, to a viewfinder screen or plate 5. In the viewfinding position, the mirror 4 is positioned in the path of light rays passing through the objective, but before the exposure is taken, the mirror 4 is swung up out of the way so that light entering through the objective may impinge upon the film or other photosensitive material. It will be noted that screen or plate 5 extends substantially parallel to the bottom wall of the housing or casing 1.

The camera is further equipped with an electric exposure meter including a moving coil indicating instrument 7 and a photoelectric cell 8, the instrument 7 having an indicator or pointer 15. In accordance with a preferred embodiment of the invention, both the instrument 7 and the photoelectric cell 8 are mounted upon a slide or plate 6 which is movable relative to the screen 5 of the viewfinder. The instrument 7 and photoelectric cell 8 are mounted in longitudinally spaced relation on the slide 6, considered with respect to the direction of the movement thereof, and the indicator 15 extends into the space or gap 9 between the instrument 7 and the photoelectric cell 8. Preferably, a casing 10 of transparent material is provided to seal the moving coil indicating instrument 7 hermetically in a dust-tight and air-tight manner. This casing may be provided with a scale, a zero mark, or similar reference indications for observing the position of the indicator 15 of the moving coil indicating instrument 7. A viewing prism 23, of a known type, may be mounted above the viewfinder screen 5 in the usual manner.

In the example shown, slide or plate 6 is mounted for displacement longitudinally of the upper wall of housing 1, and is coupled for actuation by a handle 12 through the means of a suitable mechanical connection indicated generally at 11. The mechanical connection 11 comprises a pair of intermeshed gears or pinions 18, a shaft 19 rotatable with one of the gears or pinions 18, and a radius arm or lever 20 secured to the upper end of shaft 19. Arm or lever 20 has an upwardly extending pin 22 at its free end which engages in a slot 21 in an ear or the like extending laterally from slide or plate 6, the slot 21 extending substantially perpendicular to the line of movement of the slide 6. Preferably, the handle 12 is pivotally mounted and is formed with a gear segment meshing with the other gear 18. Other types of interconnection may be used, however, such as the provision of a rack on the handle 12 meshing with the other gear 18, the handle 12, in this case, being longitudinally dispaceable.

With the described interconnection, operation of handle 12 effects movement of slide 6 to the right, as viewed in FIGS. 1 and 2, thus bringing the photoelectric cell 8, as well as the indicator 15 of the moving coil instrument 7, into the path of light rays through the finder setting plate 5. These light rays are, in the usual manner, reflected by mirror 4 to the finder setting plate 5 during a viewfinding operation. A spring 13 is connected between the slide 6 and a pin or the like on housing 1 and operates to bias the slide or plate 6 back to its initial position in which the indicator 15 and the photoelectric cell 8 are moved out of the path of light rays passing through the viewfinder plate 5.

Referring to FIG. 2, which illustrates more clearly certain features of the invention, the viewfinder plate 15 is preferably part of a range or distance measuring or finding means. Thus, in the particular arrangement shown, the usual coincidence wedges of a range finder, with the customary frosted glass ring, are mounted on the plate 5 as illustrated at 14. FIG. 2 further makes clear that the indicator 15 of the moving coil instrument 7 extends into the space on slide 6 separating the moving coil instrument 7 and the photoelectric cell 8, this indicator 15 being enclosed in the housing 10 having a tranparent wall bearing a zero-mark 17.

If it is assumed that the arrangement shown in the drawing represents a so-called "zero" instrument, the slide or plate 6 is displaceable in the direction of the arrow 16 (FIG. 2) so that the photoelectric cell 8 can be moved into the path of light rays passing through the finder setting plate 5. At the same time, the indicator 15 of the instrument 7 is also moved into the path of light rays passing through the finder plate 5, and thus is visible to the observer. For this purpose, the slide or plate 6 is made or transparent material in that portion corresponding to the deflection range of indicator 15. It will be noted further that the photoelectric cell 8 must have its light sensitive surface facing toward the finder setting plate 5.

While a specific embodiment of the invention has been shown and described in detail to illustrate the application of the principles of the invention, it will be understood that the invention may be embodied otherwise without departing from such principles.

What is claimed is:

1. In a single lens reflex camera including a housing, an objective, a viewfinder screen, and means selectively operable to direct light rays, entering through the objective, to the screen; a photoelectric exposure meter including a photoelectric cell and an indicating instrument having an indicating pointer; and a slide mounting said photoelectric cell and said indicating instrument, and mounted in said camera for movement relative to said screen in a direction substantially parallel to the viewing surface thereof and into and out of the path of light rays through said screen, the light sensitive surface of said photoelectric cell facing the viewing surface of said screen for impingement of said light rays on said photoelectric cell; said indicating instrument being mounted on said slide in longitudinally spaced relation to said photoelectric cell, considered with respect to the direction of movement of said slide, and with its indicator projecting into the space between said indicating instrument and said slide; said slide having a range of movement such that, when it is operated to move said photoelectric cell into the path of light rays through said screen, said indicator will also appear in the field of view of said screen.

2. In a single lens reflex camera as claimed in claim 1, an at least partially transparent casing on said slide hermetically sealing the indicator of said indicating instrument.

3. In a single lens reflex camera as claimed in claim 2, the transparent portion of said casing being provided with indicia cooperable with said indicator; said indicia being visible conjointly with said indicator in the field of view of said screen when said slide is operated to move said photoelectric cell into the path of light rays through said screen.

4. In a single lens reflex camera as claimed in claim 1, a manual operator projecting from said housing; and mechanism interconnecting said operator and said slide for movement of the latter upon actuation of said operator; said mechanism including a rotatable shaft, an arm extending radially from said shaft and having its free end connected to said slide, and means operatively associated with said operator for rotating said shaft upon actuation of said operator.

5. In a single lens reflex camera as claimed in claim 1, means biasing said slide to a position retracting said photoelectric cell out of the path of light rays through said screen.

6. In a single lens reflex camera as claimed in claim 2, said slide being formed of plastic transparent material as far as in the range of movement of said indicating pointer.

References Cited in the file of this patent

UNITED STATES PATENTS

| 2,754,735 | Meyer | July 17, 1956 |
| 2,784,654 | Meyer | Mar. 12, 1957 |
| 2,960,921 | Greger | Nov. 22, 1960 |
| 2,983,186 | Norwood | May 9, 1961 |

FOREIGN PATENTS

| 746,837 | Great Britain | Mar. 21, 1956 |